United States Patent
Yeo et al.

(10) Patent No.: US 11,044,736 B2
(45) Date of Patent: Jun. 22, 2021

(54) METHOD AND APPARATUS FOR TRANSMITTING AND RECEIVING DATA IN WIRELESS COMMUNICATION SYSTEM

(71) Applicant: Samsung Electronics Co., Ltd., Gyeonggi-do (KR)

(72) Inventors: Jeong-Ho Yeo, Gyeonggi-do (KR); Yong-Jun Kwak, Gyeonggi-do (KR); Young-Bum Kim, Seoul (KR); Ju-Ho Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/772,321

(22) PCT Filed: Oct. 31, 2016

(86) PCT No.: PCT/KR2016/012397
§ 371 (c)(1),
(2) Date: Apr. 30, 2018

(87) PCT Pub. No.: WO2017/074158
PCT Pub. Date: May 4, 2017

(65) Prior Publication Data
US 2018/0324824 A1 Nov. 8, 2018

(30) Foreign Application Priority Data
Oct. 30, 2015 (KR) .......................... 10-2015-0152229

(51) Int. Cl.
*H04W 72/04* (2009.01)
*H04W 72/12* (2009.01)
(Continued)

(52) U.S. Cl.
CPC ....... *H04W 72/1205* (2013.01); *H04L 1/1657* (2013.01); *H04L 5/00* (2013.01);
(Continued)

(58) Field of Classification Search
None
See application file for complete search history.

(56) References Cited

U.S. PATENT DOCUMENTS

2010/0246456 A1   9/2010   Suo et al.
2012/0320872 A1   12/2012   Yang et al.
(Continued)

FOREIGN PATENT DOCUMENTS

EP   3 101 976   12/2016
KR   1020100092475   8/2010
(Continued)

OTHER PUBLICATIONS

European Search Report dated Aug. 24, 2018 issued in counterpart application No. 16860341.3-1219, 7 pages.
(Continued)

*Primary Examiner* — Ruihua Zhang
(74) *Attorney, Agent, or Firm* — The Farrell Law Firm, P.C.

(57) ABSTRACT

Disclosed is a method for transmitting and receiving data in a wireless communication system, the method comprising the steps of: generating a wireless frame including a predetermined number of subframes; and transmitting and receiving a control signal and data by using the generated wireless frame, wherein the subframes include the predetermined number of slots, and the foremost part of each slot includes the configuration information of the slots.

16 Claims, 13 Drawing Sheets

(51) Int. Cl.
  *H04L 1/16* (2006.01)
  *H04L 5/00* (2006.01)
  *H04L 5/14* (2006.01)
(52) U.S. Cl.
  CPC .......... *H04L 5/0055* (2013.01); *H04L 5/0094* (2013.01); *H04L 5/14* (2013.01); *H04L 5/1469* (2013.01); *H04W 72/0446* (2013.01); *H04L 5/0007* (2013.01); *H04L 5/0053* (2013.01); *H04W 72/042* (2013.01)

(56) References Cited

U.S. PATENT DOCUMENTS

| | | | | |
|---|---|---|---|---|
| 2013/0315321 | A1* | 11/2013 | Rajagopal | H04L 27/2607 375/260 |
| 2014/0022960 | A1 | 1/2014 | Fu et al. | |
| 2014/0071954 | A1 | 3/2014 | Au et al. | |
| 2014/0098780 | A1* | 4/2014 | Kim | H04J 11/0023 370/329 |
| 2014/0226607 | A1 | 8/2014 | Holma et al. | |
| 2015/0043392 | A1 | 2/2015 | Susitaival et al. | |
| 2015/0071194 | A1 | 3/2015 | Kim et al. | |
| 2015/0162979 | A1 | 6/2015 | Yuk et al. | |
| 2015/0365880 | A1* | 12/2015 | Malladi | H04L 5/0007 370/312 |
| 2016/0007371 | A1 | 1/2016 | Pietraski et al. | |
| 2016/0020891 | A1* | 1/2016 | Jung | H04L 5/0064 370/280 |
| 2016/0088652 | A1* | 3/2016 | Patel | H04L 5/0044 370/329 |
| 2016/0128090 | A1* | 5/2016 | Azarian Yazdi | H04L 5/0048 370/329 |
| 2016/0128095 | A1* | 5/2016 | Damnjanovic | H04L 1/1812 370/336 |

FOREIGN PATENT DOCUMENTS

| | | |
|---|---|---|
| KR | 1020140136923 | 12/2014 |
| KR | 1020150023778 | 3/2015 |
| KR | 1020150038007 | 4/2015 |
| WO | WO 2011/025111 | 3/2011 |
| WO | WO 2013/151280 | 10/2013 |
| WO | WO 2014/124164 | 8/2014 |
| WO | WO 2015/115465 | 8/2015 |
| WO | WO 2015/157565 | 10/2015 |

OTHER PUBLICATIONS

PCT/ISA/210 Search Report issued on PCT/KR2016/012397 (pp. 3).
PCT/ISA/237 Written Opinion issued on PCT/KR2016/012397 (pp. 5).
European Search Report dated May 8, 2020 issued in counterpart application No. 20162883.1-1205, 6 pages.

* cited by examiner

| Uplink-downlink configuration (101) | Subframe number (103) | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

D: Downlink transmission subframe
S: Special subframe
U: Uplink transmission subframe

FIG.1

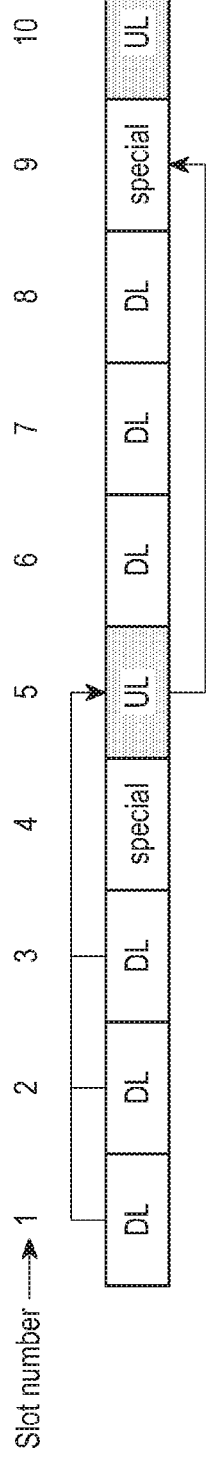
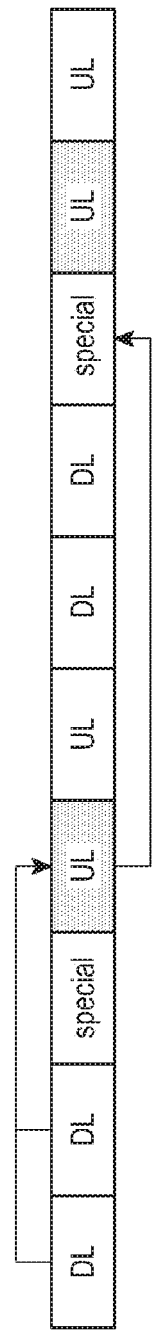
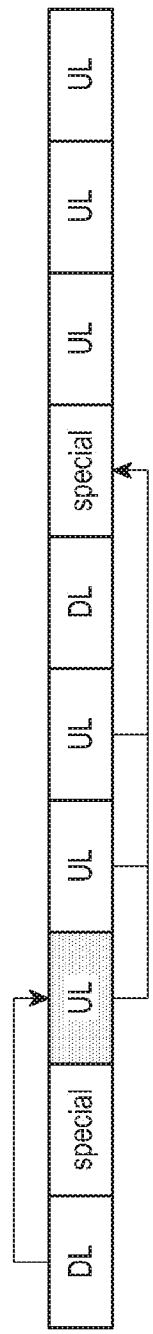
FIG.5A
FIG.5B
FIG.5C

METHOD AND APPARATUS FOR TRANSMITTING AND RECEIVING DATA IN WIRELESS COMMUNICATION SYSTEM

PRIORITY

This application is a National Phase Entry of PCT International Application No. PCT/KR2016/012397, which was filed on Oct. 31, 2016, and claims priority to Korean Patent Application No. 10-2015-0152229, which was filed on Oct. 30, 2015, the contents of each of which are incorporated herein by reference.

TECHNICAL FIELD

The disclosure relates to a wireless communication system, and more particularly to a method and a system for transmitting and receiving data in a wireless communication system.

BACKGROUND ART

In order to meet wireless data traffic demands, which have increased since the commercialization of a 4th-Generation (4G) communication system, efforts to develop an improved 5G communication system or a pre-5G communication system have been made. For this reason, the 5G communication system or the pre-5G communication system is called a beyond-4G-network communication system or a post-LTE system. Alternatively, the 5G communication system or the pre-5G communication system may be called a "new radio access technology (NR or New RAT).

In order to achieve a high data transmission rate, implementation of the 5G communication system in an mmWave band (for example, 60 GHz band) is being considered. In the 5G communication system, technologies such as beamforming, massive Multi-Input Multi-Output (MIMO), Full-Dimensional MIMO (FD-MIMO), array antenna, analog beam-forming, and large-scale antenna technologies are under discussion with the goal of mitigating propagation path loss in the mmWave band and increasing propagation transmission distance.

Further, the 5G communication system has developed technologies such as an evolved small cell, an advanced small cell, a cloud Radio Access Network (RAN), an ultra-dense network, Device-to-Device communication (D2D), a wireless backhaul, a moving network, cooperative communication, Coordinated Multi-Points (CoMP), and received interference cancellation to improve the system network.

In addition, in the 5G system, Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non-Orthogonal Multiple Access (NOMA), and Sparse Code Multiple Access (SCMA) have been developed.

Wireless communication systems have been developed from an initial wireless communication system providing voice service to a broadband wireless communication system providing a high-speed and high-quality packet data service, such as those according to communication standards including a High-Speed Packet Access (HSPA) of 3rd-Generation Partnership Project (3GPP), Long-Term Evolution (LTE) (or Evolved Universal Terrestrial Radio Access (E-UTRA)), LTE-Advanced (LTE-A), High Rate Packet Data (HRPD) of 3GPP2, Ultra-Mobile Broadband (UMB), and Institute of Electrical and Electronics Engineers (IEEE) 802.16e.

In an LTE system, which is a representative example of broadband wireless communication systems, a DownLink (DL) adopts an Orthogonal Frequency Division Multiplexing (OFDM) scheme and an UpLink (UL) adopts a Single-Carrier Frequency Division Multiple Access (SC-FDMA) scheme. The uplink is a radio link through which a User Equipment (UE) or a Mobile Station (MS) transmits data or a control signal to a Base Station (BS) (or an eNode B), and the downlink is a radio link through which the BS transmits data or a control signal to the UE. In such a multi-access scheme, time-frequency resources for carrying data or control information are allocated and operated in a manner to prevent overlapping of resources, that is, to establish orthogonality, between users so as to identify data or control information of each user.

The LTE system adopts a Hybrid Automatic Repeat reQuest (HARQ) scheme in which corresponding data is re-transmitted in a physical layer when a decoding failure occurs in initial transmission. In the HARQ scheme, when a receiver does not accurately decode data, the receiver transmits information (Negative Acknowledge: NACK) informing the transmitter of the decoding failure, and thus the transmitter may re-transmit the corresponding data on the physical layer. The receiver combines the data re-transmitted by the transmitter with the decoding-failed data, thereby increasing a data reception performance. Further, when the receiver accurately decodes the data, the receiver may transmit information (Acknowledgement: ACK) informing the transmitter of decoding success, and thus the transmitter may receive new data.

DETAILED DESCRIPTION OF THE INVENTION

Technical Problem

Meanwhile, the 5G system may be a system based on LTE and LTE-A as well as next-generation mobile communication standards. Next-generation mobile communication has been researched with the goal of operating in a high frequency band, which is higher than or equal to a 6 GHz band. The next-generation mobile communication tends to operate according to a TDD scheme, since it is not easy to secure a downlink-uplink frequency for operation of Frequency Division Duplex (FDD) in a high frequency band. For reference, the TDD system may be used in a frequency band that is equal to or smaller than the 6 GHz band.

It is expected that TDD in the 5G system requires a method of more dynamically controlling a downlink-uplink ratio compared to TDD in LTE. Further, it is expected to require a method of performing immediate retransmission in response to HARQ ACK/NACK transmission as quickly as possible.

The disclosure provides a method and an apparatus for transmitting and receiving data according to a predetermined resource structure in a wireless communication system.

The disclosure provides a radio frame structure to be used in a wireless communication system.

The disclosure provides a method and an apparatus for providing configuration information of slots in a wireless communication system.

The disclosure provides a method and an apparatus for providing information on a slot through which an ACK/NACK signal is transmitted in a wireless communication system.

The disclosure provides a method and an apparatus for providing information on a slot subsequent to a current slot in a wireless communication system.

Technical Solution

A method of transmitting and receiving data in a wireless communication system according to the present disclosure includes: generating a wireless frame including a predetermined number of subframes; and transmitting and receiving a control signal and data through the generated wireless frames, wherein the subframe includes a predetermined number of slots, and a foremost part of each slot includes configuration information of the slot.

An apparatus for transmitting and receiving data in a wireless communication system according to the present disclosure includes: a controller that generates a radio frame including a predetermined number of subframes; and a transceiver that transmits and receives a control signal and data through the generated radio frame, wherein the subframe includes a predetermined number of slots, and a foremost part of each slot includes configuration information of the slot.

BRIEF DESCRIPTION OF DRAWINGS

The above and other aspects, features and advantages of the present disclosure will be more apparent from the following detailed description taken in conjunction with the accompanying drawings, in which:

FIG. 1 illustrates the configuration of uplink and downlink for each time when data transmission/reception is performed by Time Division Duplex (TDD) in a general LTE system;

FIG. 5 illustrates another example of a slot structure for feeding back ACK/NACK for received data in a TDD structure according to an embodiment of the present disclosure;

MODE FOR CARRYING OUT THE INVENTION

Figure 2:
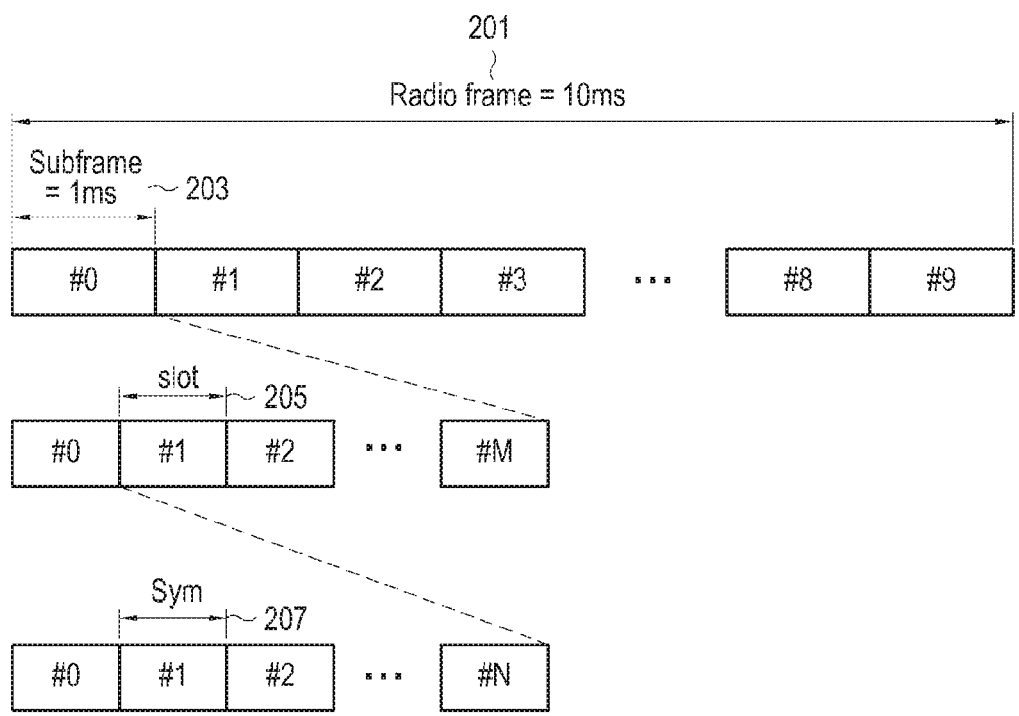
FIG. 2 illustrates an example of a frame structure according to an embodiment of the present disclosure.

In the following description of the present disclosure, a detailed description of known configurations or functions incorporated herein will be omitted when it is determined that the detailed description may make the subject matter of the present disclosure unclear. Hereinafter, embodiments of the present disclosure will be described in detail with reference to the accompanying drawings.

Although embodiments of the present disclosure described below will be divided for the convenience of description, two or more embodiments may be combined within the range where the embodiments do not collide each other.

Meanwhile, terms described later are defined in consideration of the functions of the present disclosure, but the meaning of the terms may be changed according to a user, intention of an operator, or convention. Therefore, the definitions of the terms should be made based on the contents throughout the specification.

The present disclosure may have various modifications and various embodiments, among which specific embodiments will now be described more fully with reference to the accompanying drawings. However, it should be understood that there is no intent to limit the present disclosure to the particular forms disclosed, but on the contrary, the present disclosure is to cover all modifications, equivalents, and alternatives falling within the spirit and scope of the disclosure.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

An apparatus and a method provided by an embodiment of the present disclosure can be applied to various communication systems, such as a Long Term Evolution (LTE) mobile communication system, a LTE-Advanced (LTE-A) mobile communication system, a High Speed Downlink Packet Access (HSDPA) mobile communication system, a High Speed Uplink Packet Access (HSUPA) mobile communication system, a High Rate Packet Data (HRPD) mobile communication system of 3rd Generation Project Partnership 2 (3GPP2), a Wideband Code Division Multiple Access (WCDMA) mobile communication system 3GPP2, a Code Division Multiple Access (CDMA) mobile communication system of 3GPP2, Institute of an Electrical and Electronics Engineer (EEEE) 802.16m communication system, an Evolved Packet System (EPS), a Mobile Internet Protocol (Mobile IP) system and the like.

Hereinafter, the BS is the entity that allocates resources to the UE, and may be one of an eNode B, a Node B, a Base Station (BS), a radio access unit, a base station controller, and a node on a network. The UE may include a User Equipment (UE), a Mobile Station (MS), a cellular phone, a smart phone, a computer, and a multimedia system capable of performing a communication function. In the present disclosure, DownLink (DL) refers to a wireless transmission path of a signal that the BS transmits to the UE, and UpLink (UL) refers to a wireless transmission path of a signal that the UE transmits to the BS. Further, hereinafter, although an embodiment of the present disclosure will be described as an example pertaining to a next-generation mobile communication system, namely Post-LTE or LTE-A, or a 5G system, the embodiment of the present disclosure may be applied to other communication systems having a similar technical background or channel form.

Prior to the description of the present disclosure, the configuration of Time Division Duplex (TDD) in the conventional LTE system is briefly described.

FIG. 1 illustrates the configuration of uplink and downlink for each time that data transmission/reception is performed via Time Division Duplex (TDD) in a general LTE system.

Referring to FIG. 1, an uplink and downlink configuration (UL-DL configuration) 101 is possible from 0 to 6, and each subframe 103 operates as a special subframe in uplink transmission, downlink transmission, or a predetermined scheme according to the configuration. For example, FIG. 1 illustrates that subframes 1 and 5 are configured as special subframes in configuration 0. The special subframe includes a switching time, which is required when a downlink subframe is switched to an uplink subframe, and also uplink transmission or downlink transmission according to the circumstances.

In the above-described current LTE and LTE-A systems, the TDD UL-DL configuration may be changed every 10 ms. Accordingly, compared to FDD, TDD is designed to require a longer time for HARQ ACK/NACK retransmission.

The present disclosure proposes a frame structure in which a UL-DL rate can be dynamically controlled when TDD is operated in a 5G system. Further proposed is a method of performing retransmission as rapidly as possible according to HARQ ACK/NACK transmission. Hereinafter, various embodiments for operating a TDD scheme in a 5G system will be described.

The present disclosure proposes a frame structure for a TDD operation of a 5G wireless communication system and a detailed method for UL and DL operations and HARQ retransmission.

The main concept of the present disclosure defines a predetermined length, for example, a length shorter than 1 ms, as one slot, and one slot becomes a Transmission Time Interval (TTI) in which UL and DL control information and data are transmitted and received.

Hereinafter, a basic frame structure of the 5G system will be described with reference to FIG. 2.

FIG. 2 illustrates an example of a frame structure according to an embodiment of the present disclosure.

In FIG. 2, one frame 201 has a length of 10 ms, one subframe 203 included in the frame 201 has a length of 1 ms, and one frame 201 includes 10 subframes. Meanwhile, one subframe 203 includes M slots, and the length of one slot 205 is shorter than 1 ms. One slot 205 includes N OFDM or SC-FDMA symbols. However, FIG. 2 is only an example of the frame configuration, and the length of the frame 201, the length of the subframe 203, the length of the slot 205, the length of the symbol 207, and the names of elements may be variously changed.

Hereinafter, various embodiments of the present disclosure will be described based on the frame structure of FIG. 2.

First Embodiment

Figure 3:
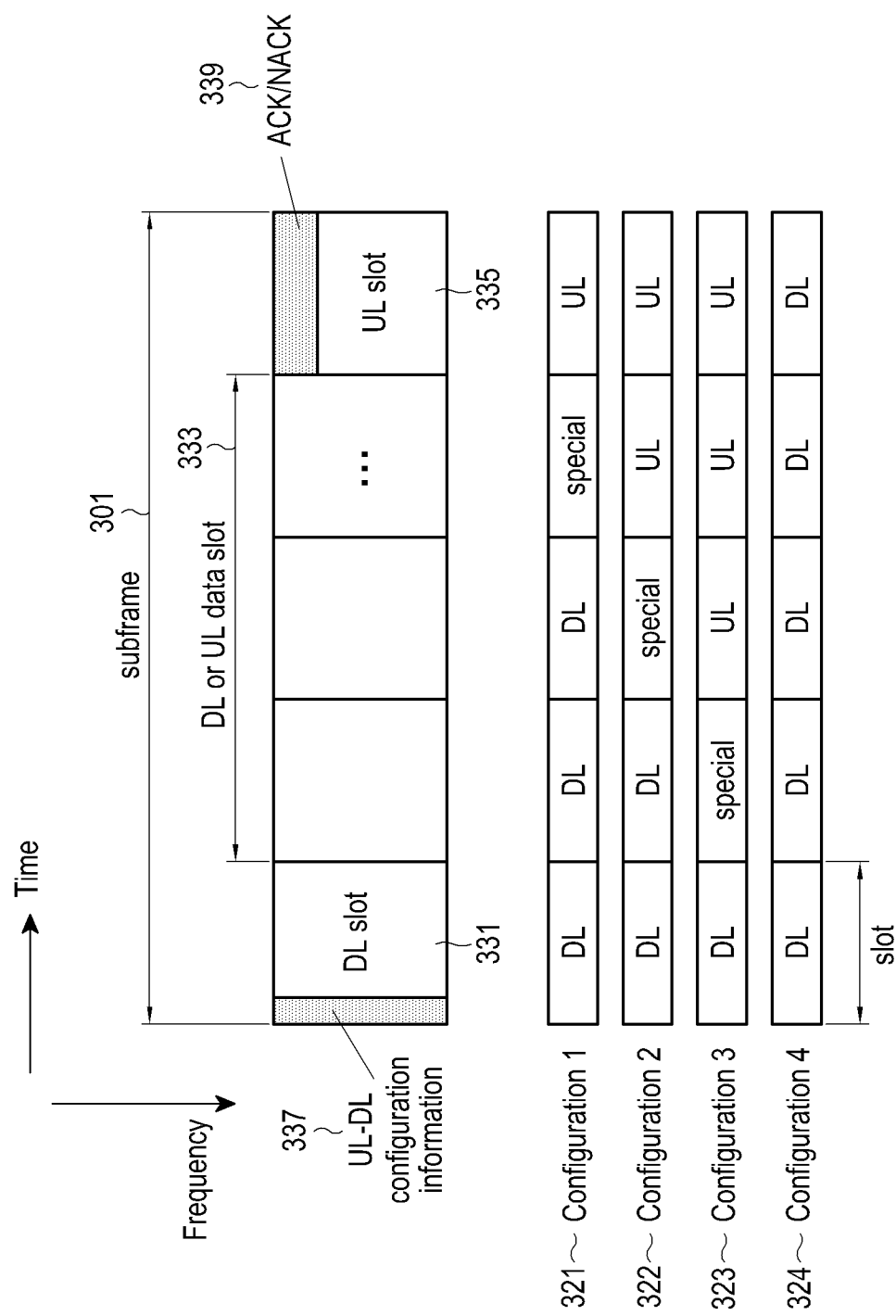
FIG. 3 illustrates a frame structure according to a first embodiment of the present disclosure.

FIG. 3 illustrates a frame structure according to a first embodiment of the present disclosure.

FIG. 3 assumes that the number (M) of slots included in one subframe 301 is 5, and slot 1 in the subframe 301 is set as a DL signal transmission slot 331, slots 2 to 4 are set as DL or UL data transmission slots 333, and slot 5 is set as a UL signal transmission slot 335. The subframe and the slot are terms according to an example of this specification, and the subframe 301 may be referred to as a slot, and the slots 333 and 335 may be referred to as mini-slots or symbols. Meanwhile, lengths of the subframe, the slot, and the mini slot may be variously changed and applied.

FIG. 3 is an embodiment in which a predetermined slot configuration may be indicated to a UE at a beginning part of the subframe. To this end, UL-DL configuration information 337 may be included in the foremost part of the frame, that is, the foremost part of the DL signal transmission slot 331, which is slot 1. Meanwhile, FIG. 3 illustrates that ACK/NACK 339 for DL data received by the UE is included in the UL signal transmission slot 335. Meanwhile, each of the slots 333 for DL or UL data transmission may be a DL transmission slot, a UL transmission slot, or a special slot. After receiving the subframe 301, the UE may first decode UL-DL configuration information 337 and recognize the configuration of slots included in the corresponding subframe 301.

Four configurations 321, 322, 323, and 324 in FIG. 3 correspond to configuration examples of the slots 333 for DL or UL data transmission. For example, in the case of configuration #1 321, slots 2 and 3 are set as slots for DL data transmission, and slot 4 is set as a special slot. That is, in the configurations 321, 322, 323, and 324, the slots 333 for DL or UL data transmission may include at least one of a DL data transmission slot, a special slot, and a UL data transmission slot. In the case of configuration #4 324, all of the slots include the DL slots, and such a configuration is possible.

Meanwhile, the UL-DL configuration information 337 may include information on slots in which ACK/NACK is transmitted. An example of transmitting ACK/NACK is described below with reference to FIG. 4.

FIG. 4 illustrates an example of a slot structure for feeding back ACK/NACK of received data in a TDD structure according to an embodiment of the present disclosure.

Figure 4A:
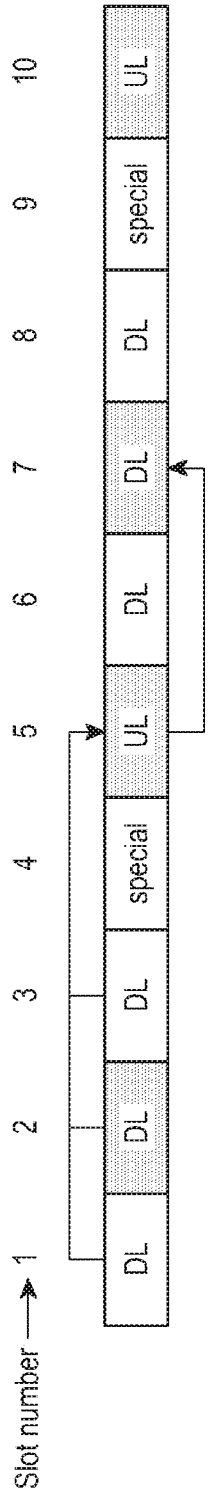
FIG. 4 illustrates an example of a slot structure for feeding back ACK/NACK for received data in a TDD structure according to an embodiment of the present disclosure.

In the slot structure of FIG. 4A, through UL slot 5, the UE feeds back ACK/NACK signals for DL data received through slots 1, 2, and 3 to the BS. Meanwhile, through DL slot 7, the BS feeds back the ACK/NACK signals of the data received from the UE through UL slot 5 to the UE. In a modified embodiment, the BS may be set to feed back, through slot 6, the ACK/NACK signal for the data received through slot 5 to the UE.

Figure 4B:
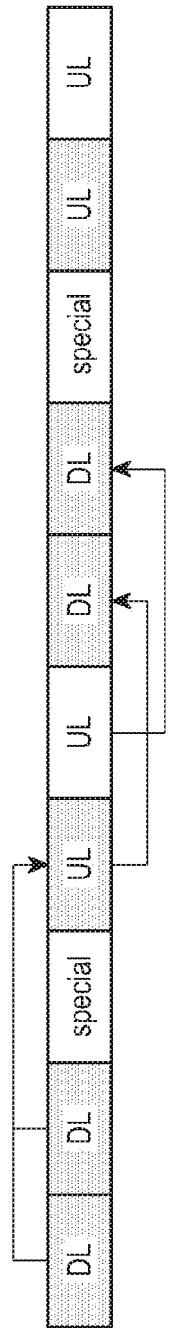

In the slot structure of FIG. 4B, through slot 4, the UE feeds back ACK/NACK signals for DL data received through slots 1 and 2 to the BS. Meanwhile, through slots 6 and 7, respectively, the BS may feed back ACK/NACK signals for UL data received through slot 4 or 5 to the UE.

Figure 4C:
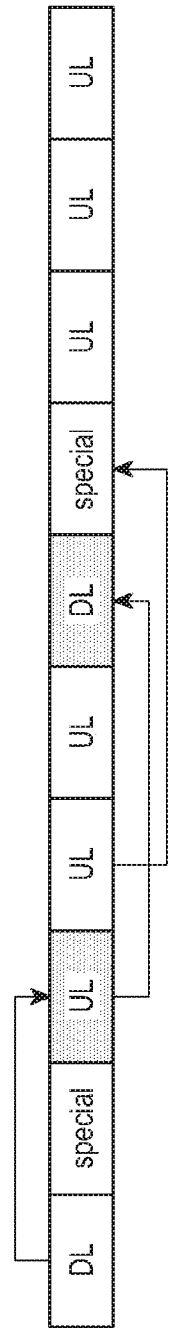

In the slot structure of FIG. 4C, the UE may feed back, through slot 3, the ACK/NACK signal for DL data received through slot 1 to the BS, and the BS may feed back ACK/NACK signals for UL data received through slots 3, 4, and 5 together through slot 6 or individually through slots 6 and 7.

The structures illustrated in FIGS. 4A, 4B, and 4C are only examples for transmitting/receiving ACK/NACK in each slot configuration, and can be easily changed by the relation of other slots.

FIG. 5 illustrates another example of the slot structure for feeding back ACK/NACK for received data in the TDD structure according to an embodiment of the present disclosure.

Basically, ACK/NACK for data received by the UE in the DL slot is fed back through a UL slot through which ACK/NACK can be most rapidly fed back. The UL slot capable of performing most rapid feedback may be changed to an initial UL shot after a predetermined time (or slot) passes after DL data reception. Further, the ACK/NACK signal for data received by the BS in UL is fed back through a special slot.

In an example of FIG. 5, DL transmission in a special slot is possible. In the slot configuration structure of FIGS. 5A, 5B, and 5C, ACK/NACK for data received through each DL slot is fed back through a UL slot appearing first after the DL slot. Meanwhile, ACK/NACK for data received through the UL slot is fed back through an initial special slot after the UL slot.

Second Embodiment

The second embodiment is an embodiment in which one slot having a predetermined length shorter than 1 ms is determined as a Transmission Time Interval (TTI) and UL control information, DL control information, and user data are transmitted and received, and the basic frame structure of a 5G communication system will be described with reference to FIGS. 6 and 7. Hereinafter, the slot may be referred to as a TTI.

Figure 6:
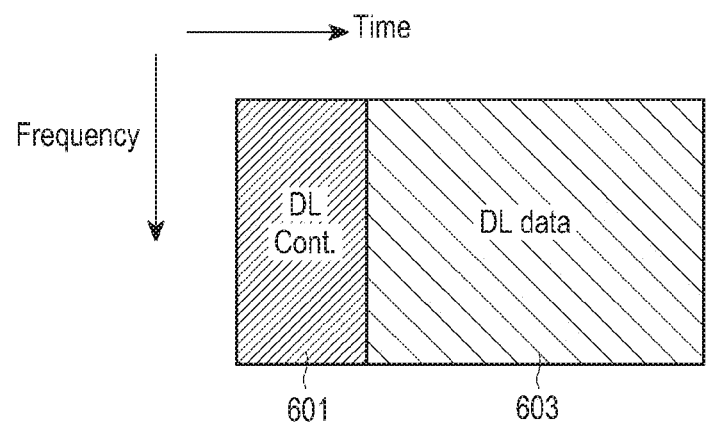
FIG. 6 illustrates an example of a DL slot according to a second embodiment of the present disclosure.

FIG. 6 illustrates an example of a DL slot according to the second embodiment of the present disclosure.

Referring to FIG. 6, a DL control signal 601 and DL data 603 are transmitted. FIG. 6 shows a structure in which a control signal and data are separated and transmitted on a time axis, but the control signal and the data may be separated and transmitted on a frequency axis.

Figure 7A:
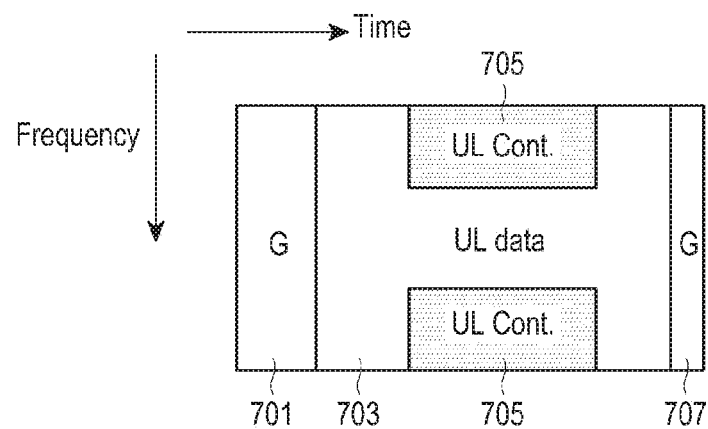
FIG. 7A illustrates an example of a UL slot according to the second embodiment of the present disclosure.

FIG. 7A illustrates an example of a UL slot according to the second embodiment of the present disclosure.

FIG. 7A shows a structure in which a UL control signal 705 and UL data 703 are transmitted. In addition, a guard period or guard time, in which no data is transmitted/received, is attached to a front part 701 and a rear part 707 of the slot. The guard periods 701 and 707 are to secure time required for switching from DL to UL. However, the guard periods may be used for other purposes. According to the circumstances, the length of the guard period may be set as "0" in which case there is no guard period.

Figure 7B:
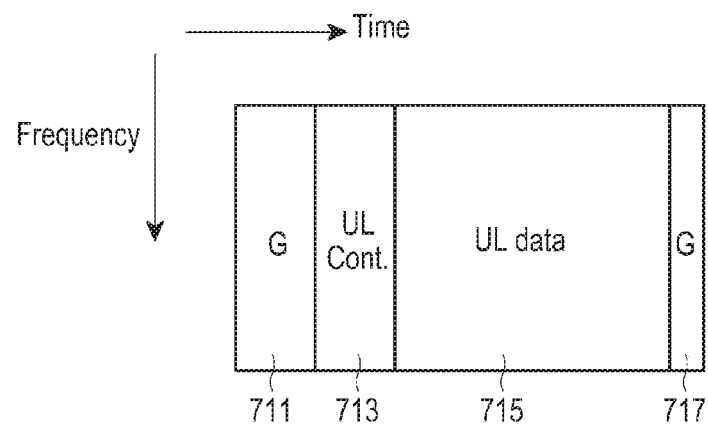
FIG. 7B illustrates an example in which a UL control signal 713 and UL data 715 are separated and transmitted on a time axis.
Figure 7C:
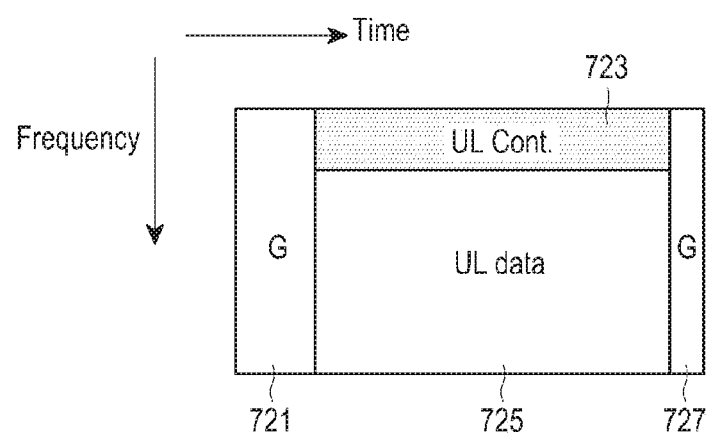
FIG. 7C illustrates an example in which a UL control signal 723 and UL data 725 are separated and transmitted on a frequency axis.

Meanwhile, although FIG. 7A illustrates a structure in which control signals are arranged on both ends of the frequency, the arrangement structure of a control signal and a data signal may be variously changed. For example, FIG. 7B illustrates an example in which a UL control signal 713 and UL data 715 are separated and transmitted on a time axis. In another example, FIG. 7C illustrates an example in which a UL control signal 723 and UL data 725 are separated and transmitted on a frequency axis.

Further, in another modified embodiment, a DL slot and a UL slot may be connected to each other and operate as one slot. For example, the DL slot of FIG. 6 and the UL slot of FIG. 7B may be connected to each other and become one slot. Such a newly defined slot may include the DL control signal 601, the DL data 603, the guard period 711, the UL control signal 713, the UL data 715, and the guard period 717. One or more of the UL data 715 and the guard period 717 may be omitted.

Third Embodiment

Figure 8:
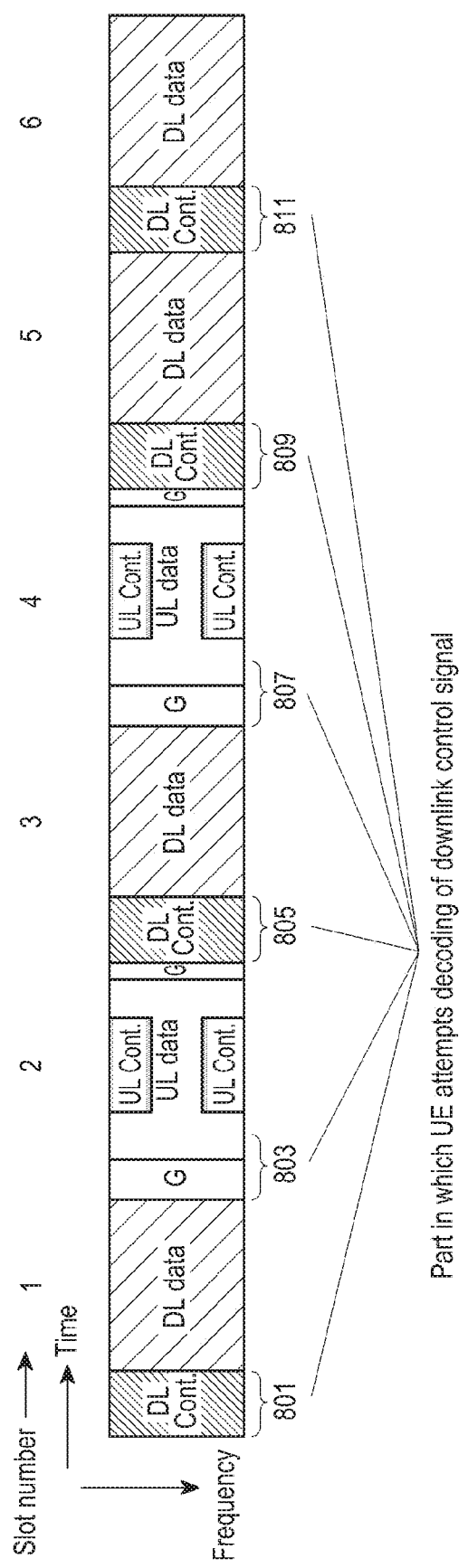
FIG. 8 illustrates an example for allowing the UE to recognize whether the corresponding slot is a DL slot or a UL slot when the DL slot and the UL slot described in the second embodiment are randomly set according to a third embodiment of the present disclosure.

FIG. 8 illustrates an example for allowing the UE to recognize whether the corresponding slot is a DL slot or a UL slot when the DL slot and the UL slot described in the second embodiment are randomly set according to the third embodiment of the present disclosure.

The BS may use the slot structure proposed in the second embodiment when the corresponding slot is used as the DL or UL slot. After receiving foremost parts 801, 803, 805, 807, and 809 of all slots on the time axis and attempting to decode them, the UE determines that the corresponding slot is the DL slot when there is a DL control signal, of which decoding has been succeeded, and receives the control signal and data in the DL slot.

FIG. 8 shows an example in which 6 slots are transmitted, where signals are transmitted/received in the order of DL-UL-DL-UL-DL-DL. The order of DL and UL slots may be randomly set by the BS. The BS may allocate resources for UL transmission in advance to a UE that needs the UL transmission, and the UE having received resources may recognize in advance when the UE should perform the UL transmission (that is, which slot is used for the UL transmission). When the UE has failed in decoding the DL control signal in any slot, the UE determines that the corresponding slot is the DL slot but that there is no control signal transmitted to the UE itself in the corresponding DL slot, or determines that the corresponding slot is a UL slot through which the UE itself cannot transmit a signal.

Fourth Embodiment

In the fourth embodiment, a slot indicator that indicates whether the next slot is a DL slot or a UL slot is included in the front part of the DL slot. The following description will be made with reference to FIGS. 9 and 10.

Figure 9:
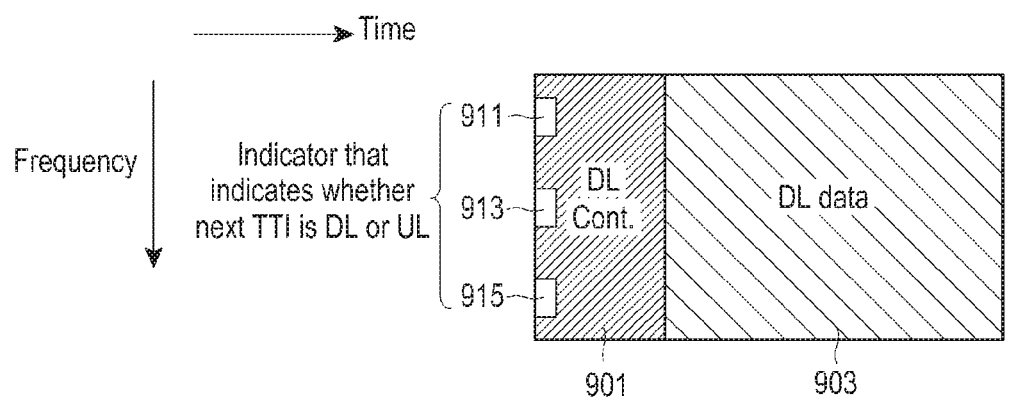
FIG. 9 illustrates an example in which a slot indicator, which indicates whether a slot to be transmitted next is a DL slot or a UL slot, is included in a DL control signal on a front part according to a fourth embodiment of the present disclosure.

FIG. 9 illustrates an example in which a slot indicator that indicates whether a slot to be transmitted next is a DL slot or a UL slot is included in a DL control signal on the front part of the slot according to the fourth embodiment of the present disclosure.

In FIG. 9, slot indicators 911, 913, and 915 that indicate whether the next slot is a DL slot or a UL slot are included in the front part of a DL control signal region 901. Slots indicated by the slot indicators 911, 913, and 915 may be set as the slot subsequent to the current slot, or may be set as a slot after a predetermined time, for example, n slots.

Figure 10:
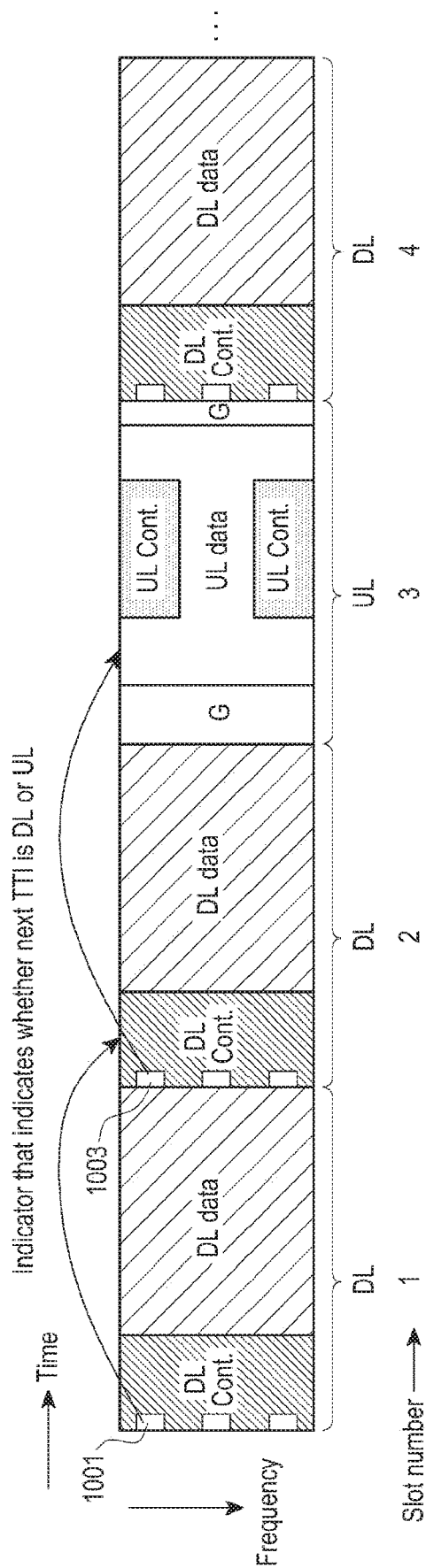
FIG. 10 illustrates an operation example in which a slot indicator, which indicates whether a slot to be transmitted next is a DL slot or a UL slot, is included in a DL control signal on a front part according to the fourth embodiment of the present disclosure.

FIG. 10 illustrates an operation example in which the slot indicator that indicates whether the slot to be transmitted next is the DL slot or the UL slot is included in the DL control signal on the front part of the slot according to the fourth embodiment of the present disclosure.

For a UL frame, the frame structure used in FIGS. 7B and 7C may be used. Referring to FIG. 10, a slot indicator, which indicates that slot 2 is a DL slot, is included in the front part of slot 1, and a slot indicator, which indicates that slot 3 is a UL slot, is included in the front part of slot 2. In the front part of slot 4, a slot indicator, which indicates whether the next appearing slot is a DL slot or a UL slot, is included. When each UE may receive the corresponding slot indicator and when the next slot is the UL slot and the UE does not perform UL transmission, decoding of a DL control signal may not be attempted in the front part of the slot.

Fifth Embodiment

In the fifth embodiment, the slot indicator, which indicates whether the next slot is a DL slot or a UL slot, is included in a rear part of a DL slot. The following description will be made with reference to FIGS. 11 and 12.

Figure 11:
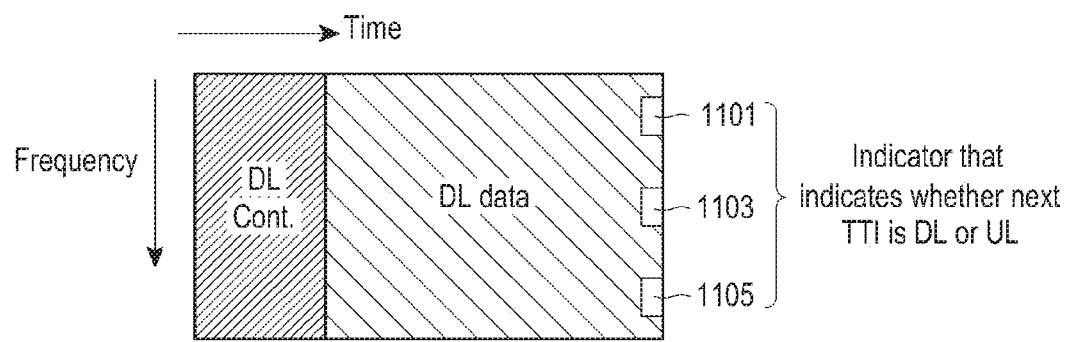
FIG. 11 illustrates an example in which a slot indicator, which indicates whether a slot to be transmitted next is a DL slot or a UL slot, is included in a DL control signal on a rear part according to a fifth embodiment of the present disclosure.

FIG. 11 illustrates an example in which a slot indicator, which indicates whether a slot to be transmitted next is a DL slot or a UL slot, is included in a DL control signal on the rear part of the slot according to the fifth embodiment of the present disclosure.

Slots indicated by the slot indicators 1101, 1103, and 1105 may be set as the slot subsequent to the current slot or may be set as a slot after a predetermined time, for example, n slots.

Figure 12:
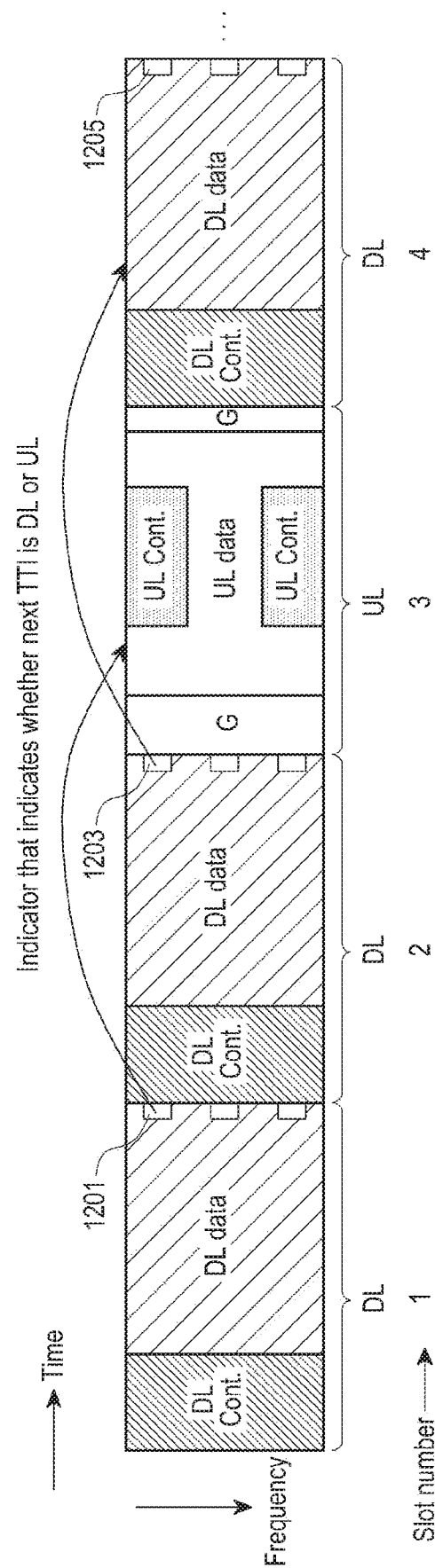
FIG. 12 illustrates an operation example in which a slot indicator, which indicates whether a slot to be transmitted next is a DL slot or a UL slot, is included in a DL control signal on a rear part according to the fifth embodiment of the present disclosure.

FIG. 12 illustrates an operation example in which a slot indicator, which indicates whether a slot to be transmitted next is a DL slot or a UL slot, is included in the DL control signal on the rear part of the slot according to the fifth embodiment of the present disclosure.

In FIG. 12, as UL resources, the resources having the structure described in FIGS. 7B and 7C may be used. Referring to FIG. 12, a slot indicator 1201, which indicates that slot 3 is a UL slot, is included in the rear part of slot 1, and a slot indicator 1203, which indicates that slot 4 is a DL slot, is included in the rear part of slot 2. In the rear part of slot 4, an indicator 1205 that indicates whether slot 6, which is 2 slots later, is a DL slot or a UL slot, is included. When each UE receives the corresponding slot indicator and when the slot, which is 2 slots later from the current slot, is a UL slot and the UE transmits no UL data, decoding of a DL control signal may not be attempted in the rear part of the corresponding slot.

In the embodiment using the slot indicator, which indicates whether the next slot is a DL slot or a UL slot according to the fourth embodiment and the fifth embodiment, the slot indicator may be transmitted through mapping of a particular sequence or a control signal of which particular bit values are encoded to a channel code.

Hereinafter, a UE apparatus and a BS apparatus for implementing the above-described embodiments of the present disclosure will be described with reference to FIGS. 13 and 14.

The first embodiment to the fourth embodiment illustrate the slot structure for DL or UL operation in TDD transmission and operation of the UE and the BS. In order to perform their respective operations, the BS and the UE apparatus should operate according to each of the above-described embodiments.

Figure 13:
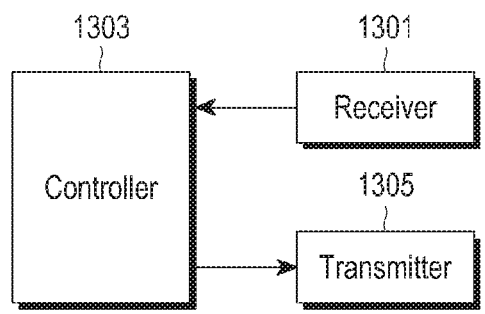
FIG. 13 illustrates the configuration a UE apparatus according to an embodiment of the present disclosure.

FIG. 13 illustrates the configuration of a UE apparatus according to an embodiment of the present disclosure.

As illustrated in FIG. 13, the UE includes a receiver 1301, a transmitter 1305, and a controller 1303.

The receiver 1301 and the transmitter 1305 may be collectively called a transceiver. The transceiver may transmit and receive a signal to and from the BS. The signal may include control information and data. To this end, the transceiver may include an RF transmitter for up-converting and amplifying a frequency of the transmitted signal and an RF receiver for low-noise amplifying the received signal and down-converting the frequency. The transceiver may receive a signal through a wireless channel, output the received signal to the controller 1303, and transmit a signal output from the controller 1303 through a wireless channel.

The controller 1303 may control a series of processes to allow the UE to operate according to the embodiment of the present disclosure.

Figure 14:
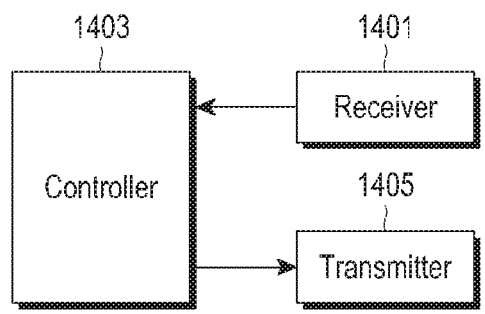
FIG. 14 illustrates the configuration of a BS apparatus according to an embodiment of the present disclosure.

FIG. 14 illustrate the configuration of a BS apparatus according to an embodiment of the present disclosure.

As illustrated in FIG. 14, the BS according to the present disclosure includes a receiver 1401, a transmitter 1405, and a controller 1403.

The receiver 1401 and the transmitter 1405 may be collectively called a transceiver. The transceiver may transmit and receive a signal to and from the UE. The signal may include control information and data. To this end, the transceiver may include an RF transmitter for up-converting and amplifying a frequency of the transmitted signal and an RF receiver for low-noise amplifying the received signal and down-converting the frequency. The transceiver may receive a signal through a wireless channel, output the received signal to the controller 1403, and transmit a signal output from the controller 1403 through a wireless channel.

The controller 1403 may control a series of processes to allow the BS to operate according to the embodiment of the present disclosure. For example, the controller 1403 may determine the arrangement of DL and UL slots based on the size of data, which should be transmitted or received, and other information, and accordingly DL control information and data can be transmitted. In this case, the arrangement of the DL and UL slots may be changed every subframe or every slot.

According to the above-described embodiments of the present disclosure, by dynamically controlling a UL-DL ratio in a TDD type communication system, it is possible to efficiently manage frequency resources and rapidly perform retransmission in response to HARQ ACK/NACK.

Meanwhile, the exemplary embodiments disclosed in the specification and drawings are merely presented to easily describe technical contents of the present disclosure and help the understanding of the present disclosure and are not intended to limit the scope of the present disclosure. That is, it is obvious to those skilled in the art to which the present disclosure belongs that different modifications can be achieved based on the technical spirit of the present disclosure. Further, if necessary, the above respective embodiments may be employed in combination. For example, a base station and a UE may be operated using a combination of embodiments 1 and 3 of the present disclosure.

Particular aspects of the present disclosure may be implemented as a computer-readable code in a computer-readable recording medium. The computer-readable recording medium is a predetermined data storage device which can store data which can be read by a computer system. The computer-readable recording medium may include a Read-Only Memory (ROM), a Random-Access Memory (RAM), CD-ROMs, magnetic tapes, floppy disks, optimal data storage devices, and carrier waves (such as data transmission through the Internet). The computer-readable recording medium may be distributed through computer systems connected to the network, and accordingly the computer-readable code is stored and executed in a distributed manner. Further, functional programs, codes, and code segments to achieve the present disclosure may be easily interpreted by programmers skilled in the art.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. It will also be understood that a method and apparatus according to an embodiment of the present disclosure may be implemented by a computer or portable terminal including a controller and a memory, and the memory is an example of a machine readable device adapted to store a program or programs including instructions for implementing embodiments of the present disclosure.

Accordingly, the present disclosure includes a program for a code implementing the apparatus and method described in the appended claims of the specification and a machine (a computer or the like)-readable storage medium for storing the program. Further, the program may be electronically carried by any medium such as a communication signal transferred through a wired or wireless connection, and the present disclosure appropriately includes equivalents thereof.

The invention claimed is:

1. A method of a base station (BS) in a wireless communication system, the method comprising:
generating first control information including a slot indicator, wherein the first control information is included in a first slot and the slot indicator includes a slot configuration indicating whether each slot after the first slot including the first control information is a downlink symbol, an uplink symbol, or a special symbol;
generating second control information including slot information for transmission of a response signal for a downlink data signal;
transmitting the first control information;
transmitting the second control information;
transmitting the downlink data signal; and
receiving the response signal for the downlink data signal based on the second control information,
wherein the response signal for the downlink data signal is transmitted in a second slot indicated by the slot information,
wherein, when decoding a first part of the first slot succeeds in a user equipment (UE), decoding a remaining parts of the first slot is performed in the UE, and
wherein, when decoding the first part of the first slot fails in the UE, the first slot is determined as an uplink slot or a downlink slot having no data transmitted to the UE, and decoding the remaining parts of the first slot is not performed in the UE.

2. The method of claim 1, wherein slots included in a radio frame include at least one of a downlink slot, an uplink slot, and a special slot,
wherein, in the downlink slot and the uplink slot, the first control information, the second control information, and data are separated and transmitted on a time or frequency domain, and
wherein the uplink slot includes a guard period in at least a part of boundaries with a neighboring slot.

3. The method of claim 2, wherein, among the slots, a downlink slot includes the slot indicator in at least one of a first part or an end part of the corresponding downlink slot.

4. The method of claim 1, wherein the second control information is included in a specific part of each slot.

5. A base station (BS) in a wireless communication system, the BS comprising:
at least one processor configured to:
generate first control information including a slot indicator, wherein the first control information is included in a first slot and the slot indicator includes a slot configuration indicating whether each slot after the first slot including the first control information is a downlink symbol, an uplink symbol, or a special symbol, and
generate second control information including slot information for transmission of a response signal for a downlink data signal; and
a transceiver configured to:
transmit and receive the first control information,
transmit and receive the second control information,
transmit the downlink data signal, and
receive the response signal for the downlink data signal based on the second control information,
wherein the response signal for the downlink data signal is transmitted in a second slot indicated by the slot information,
wherein, when decoding a first part of the first slot succeeds in a user equipment (UE), decoding a remaining parts of the first slot is performed in the UE, and
wherein, when decoding the first part of the first slot fails in the UE, the first slot is determined as an uplink slot or a downlink slot having no data transmitted to the UE, and decoding the remaining parts of the first slot is not performed in the UE.

6. The BS of claim 5, wherein slots included in a radio frame include at least one of a downlink slot and an uplink slot, and
wherein, in the downlink slot and the uplink slot, the first control information, the second control information, and data are separated and transmitted on a time or frequency domain, and
wherein, the uplink slot includes a guard period in at least a part of boundaries with a neighboring slot.

7. The BS of claim 6, wherein, among the slots, a downlink slot includes the slot indicator in at least one of a first part or an end part of the corresponding downlink slot.

8. The BS of claim 5, wherein the second control information is included in a specific part of each slot.

9. A user equipment (UE) in a wireless communication system, the UE comprising:
- a transceiver configured to:
  - receive first control information including a slot indicator, wherein the first control information is included in a first slot and the slot indicator includes a slot configuration indicating whether each slot after the first slot including the first control information is a downlink symbol, an uplink symbol, or a special symbol,
  - receive second control information including slot information for transmission of a response signal for a downlink data signal,
  - receive the downlink data signal, and
  - transmit the response signal for the downlink data signal based on the second control information; and
- at least one processor connected to the transceiver, and configured to identify time resources within a slot as downlink time resources or uplink time resources based on the slot indicator,
- wherein the response signal for the downlink data signal is transmitted in a second slot indicated by the slot information,
- wherein the at least one processor is further configured to:
  - when decoding a first part of the first slot succeeds in the UE, decoding a remaining parts of the first slot, and
  - when decoding the first part of the first slot fails in the UE, determining the first slot as an uplink slot or a downlink slot having no data transmitted to the UE, and decoding the remaining parts of the first slot is not performed in the UE.

10. The UE of claim 9, wherein slots included in a radio frame include at least one of a downlink slot and an uplink slot, and
- wherein, in the downlink slot and the uplink slot, the first control information, the second control information, and data are separated and transmitted on a time or frequency domain, and
- wherein, the uplink slot includes a guard period in at least a part of boundaries with a neighboring slot.

11. The UE of claim 10, wherein, among the slots, a downlink slot includes the slot indicator in at least one of a first part or an end part of the corresponding slot.

12. The UE of claim 9, wherein the second control information is included in a specific part of each slot.

13. A method of a user equipment (UE) in a wireless communication system, the method comprising:
- receiving first control information including a slot indicator, wherein the first control information is included in a first slot and the slot indicator, includes a slot configuration indicating whether each slot after the first slot including the first control information is a downlink symbol, an uplink symbol, or a special symbol;
- receiving second control information including slot information for transmission of a response signal for a downlink data signal;
- receiving the downlink data signal;
- identifying time resources within the first slot are downlink time resources or uplink time resources based on the slot indicator; and
- transmitting the response signal for the downlink data signal based on the second control information,
- wherein the response signal for the downlink data signal is transmitted in a second slot indicated by the slot information, and
- wherein the method further comprises:
  - when decoding a first part of the first slot succeeds in the UE, decoding a remaining parts of the first slot; and
  - when decoding the first part of the first slot fails in the UE, determining the first slot as an uplink slot or a downlink slot having no data transmitted to the UE, and decoding the remaining parts of the first slot is not performed in the UE.

14. The method of claim 13, wherein the second control information is included in a specific part of each slot.

15. The method of claim 13, wherein slots included in a radio frame include at least one of a downlink slot, an uplink slot, and a special slot,
- wherein, in the downlink slot and the uplink slot, the first control information, the second control information, and data are separated and transmitted on a time or frequency domain, and
- wherein the uplink slot includes a guard period in at least a part of boundaries with a neighboring slot.

16. The method of claim 15, wherein, among the slots, a downlink slot includes the slot indicator in at least one of a first part or an end part of the corresponding downlink slot.

* * * * *